Patented July 19, 1927.

1,636,201

UNITED STATES PATENT OFFICE.

ERNEST H. VOLWILER, OF HIGHLAND PARK, ILLINOIS, ASSIGNOR TO ABBOTT LABORATORIES, OF NORTH CHICAGO, ILLINOIS, A CORPORATION OF ILLINOIS.

BARBITURIC-ACID DERIVATIVE.

No Drawing.  Application filed July 16, 1926. Serial No. 123,011.

My invention relates to the production of derivatives of barbituric acid, having the following general structure,

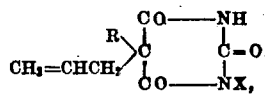

in which R represents a butyl group, and X represents hydrogen, a metallic element or an organic base. These compounds exert pronounced hypnotic action, with relatively low toxicity.

The compounds may be synthesized as follows:

Allyl-n-butyl-barbituric acid may be prepared as follows:—

Mono-n-butyl barbituric acid is dissolved in one molecular equivalent of 30% sodium hydroxide, filtered, and 1.1 equivalents of allyl bromide added; the mixture is stirred for 48 hours, by which time the allyl bromide has disappeared, and crystals of allyl-n-butyl barbituric acid have separated. The solid is filtered off, and recrystallized from dilute alcohol or water. It is obtained as white crystals, melting at 128° C.; it is only slightly soluble in water but readily soluble in alcohol and ether.

I claim as my invention:

1. As new articles of manufacture, the barbituric acid derivatives

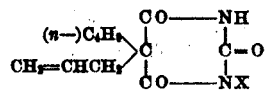

where X represents hydrogen, a metallic element, or an organic base.

2. As a new article of manufacture, the compound n-butyl-allyl-barbituric acid, which exists as white crystals, melting at 128° C.

July 7, 1926.

ERNEST H. VOLWILER.